(12) United States Patent
Grasso et al.

(10) Patent No.: US 9,505,300 B2
(45) Date of Patent: Nov. 29, 2016

(54) COOLING ASSEMBLY FOR A MOTOR VEHICLE

(75) Inventors: Bruno Grasso, Asti (IT); Carlo Canuto, Asti (IT)

(73) Assignee: Gate S.R.L, Turin (IT)

( * ) Notice: Subject to any disclaimer, the term of this patent is extended or adjusted under 35 U.S.C. 154(b) by 692 days.

(21) Appl. No.: 13/196,125

(22) Filed: Aug. 2, 2011

(65) Prior Publication Data
US 2012/0024494 A1 Feb. 2, 2012

(30) Foreign Application Priority Data
Aug. 2, 2010 (IT) .............................. TO2010A0667

(51) Int. Cl.
| B60H 1/00 | (2006.01) |
| B60K 11/04 | (2006.01) |
| F01P 3/18 | (2006.01) |
| F01P 11/10 | (2006.01) |
| F28D 1/04 | (2006.01) |
| F28F 9/00 | (2006.01) |

(52) U.S. Cl.
CPC .................. *B60K 11/04* (2013.01); *F01P 3/18* (2013.01); *F01P 11/10* (2013.01); *F28D 1/0435* (2013.01); *F28F 9/002* (2013.01); *F01P 2003/187* (2013.01); *F01P 2060/14* (2013.01); *F01P 2070/50* (2013.01); *F28F 2280/02* (2013.01)

(58) Field of Classification Search
CPC ..................................................... F28F 9/002
USPC ............. 165/41, 42, 44, 51, 60, 67, 77, 122, 165/148, 149
See application file for complete search history.

(56) References Cited

U.S. PATENT DOCUMENTS

| 5,671,803 | A | 9/1997 | Tepas et al. |
| 6,073,594 | A * | 6/2000 | Tsukiana et al. .......... 123/41.33 |
| 6,199,622 | B1 * | 3/2001 | Mashio et al. ................... 165/67 |
| 6,318,450 | B1 * | 11/2001 | Acre ................................ 165/67 |
| 6,470,961 | B1 * | 10/2002 | Case ................................ 165/78 |
| 6,510,891 | B2 * | 1/2003 | Anderson et al. ............... 165/67 |
| 2001/0004010 | A1 * | 6/2001 | Halm ............................. 165/67 |
| 2006/0237175 | A1 * | 10/2006 | Hara ............................ 165/140 |
| 2007/0125525 | A1 * | 6/2007 | Heine ........................... 165/121 |
| 2008/0135209 | A1 * | 6/2008 | Lowe et al. .................... 165/77 |
| 2008/0156456 | A1 * | 7/2008 | Hamida et al. ................ 165/67 |

FOREIGN PATENT DOCUMENTS

| EP | 0494353 B1 | 10/1995 |
| JP | 60-119321 A | 6/1985 |

* cited by examiner

*Primary Examiner* — Travis Ruby
(74) *Attorney, Agent, or Firm* — Muncy, Geissler, Olds & Lowe, P.C.

(57) ABSTRACT

A cooling assembly for a motor vehicle provided with a liquid-cooled internal combustion engine. The assembly has a radiator intended to be supplied with a flow of a liquid coolant coming from the engine, a condenser for use in an air-conditioning system of the vehicle, mounted facing the radiator, and a ventilation assembly. The ventilation assembly includes a plate-like shroud mounted facing the condenser, on a side remote from the radiator, and carrying a motor-driven fan capable of inducing a flow of air through the radiator and the condenser. The ventilation assembly is connected directly to the radiator, and the condenser is directly connected to the ventilation assembly and/or the radiator such that it is separately detachable and extractable, and possibly mountable again, leaving the ventilation assembly and the radiator in place.

17 Claims, 4 Drawing Sheets

COOLING ASSEMBLY FOR A MOTOR VEHICLE

CROSS REFERENCE TO RELATED APPLICATIONS

This non-provisional patent application claims priority under 35 U.S.C. §119(a) from Patent Application No. TO2010A000667 filed in Italy on Aug. 2, 2010.

FIELD OF THE INVENTION

This invention relates to a cooling assembly for a motor vehicle provided with a liquid-cooled internal combustion engine.

BACKGROUND OF THE INVENTION

More specifically, the invention relates to a cooling assembly comprising; a radiator intended to be supplied with a flow of a liquid coolant coming from the engine, a condenser for an air-conditioning system of the vehicle, mounted facing the radiator, and a ventilation assembly including a plate-like structure mounted facing the condenser, opposite the radiator with respect thereto, and carrying a motor-driven fan capable of inducing a flow of air through the radiator and the condenser.

Such cooling assemblies are mounted, in a preassembled state, in the engine compartment of motor vehicles, and present the problem that, in the case of subsequent servicing, in particular of the condenser, it is necessary to detach the entire assembly, with a resulting expenditure of time and money.

SUMMARY OF THE INVENTION

Hence there is a desire for a cooling assembly which makes it possible to remedy this problem.

This is achieved in the present invention by using a cooling assembly of the type defined above, which is characterized in that the ventilation assembly is connected directly to the radiator, and the condenser is connected to the ventilation assembly and/or the radiator such that it is separately detachable and extractable, and possibly mountable again, leaving the ventilation assembly and the radiator in place.

Accordingly, in one aspect thereof, the present invention provides a cooling assembly for a motor vehicle provided with a liquid-cooled internal combustion engine, comprising: a radiator intended to be supplied with a flow of a liquid coolant coming from the engine, a condenser for use in an air-conditioning system of the vehicle, mounted facing the radiator, and a ventilation assembly including a plate-like shroud mounted facing the condenser, on a side remote from the radiator, and carrying a motor-driven fan capable of inducing a flow of air through the radiator and the condenser; wherein the ventilation assembly is connected directly to the radiator, and the condenser is connected to the ventilation assembly and/or the radiator such that it is separately detachable and extractable, and possibly mountable again, leaving the ventilation assembly and the radiator in place.

Preferably, the condenser is mountable and detachable between the radiator and the ventilation assembly with a substantially translational displacement.

Preferably, the ventilation assembly has a plurality of seats in/from which corresponding appendixes of the condenser are engageable/disengageable during a translation displacement of the condenser in an interspace defined between the radiator and the ventilation assembly.

Preferably, the appendix is substantially 'L' shaped, with its distal end located in a corresponding seat of the ventilation assembly.

Preferably, the condenser has at least one fastening bracket which protrudes transversely and is adapted to be detachably fastened to the ventilation assembly and/or the radiator.

Preferably, the fastening bracket is fastened to the ventilation assembly and/or the radiator by a screw passing through a hole formed in the distal end of the fastening bracket.

Preferably, the distal end of the fastening bracket is bent.

Preferably, the shroud comprises a plurality of appendixes having respective openings in which corresponding latching members of the radiator are engaged.

Preferably, the latching members are substantially L shaped, with its distal end snap fastened to the appendixes of the ventilation assembly.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 3 is a perspective view showing the ventilation assembly assembled with the radiator, in view of the insertion and fastening of the condenser there between.

DETAILED DESCRIPTION OF THE PREFERRED EMBODIMENTS

Figure 1:
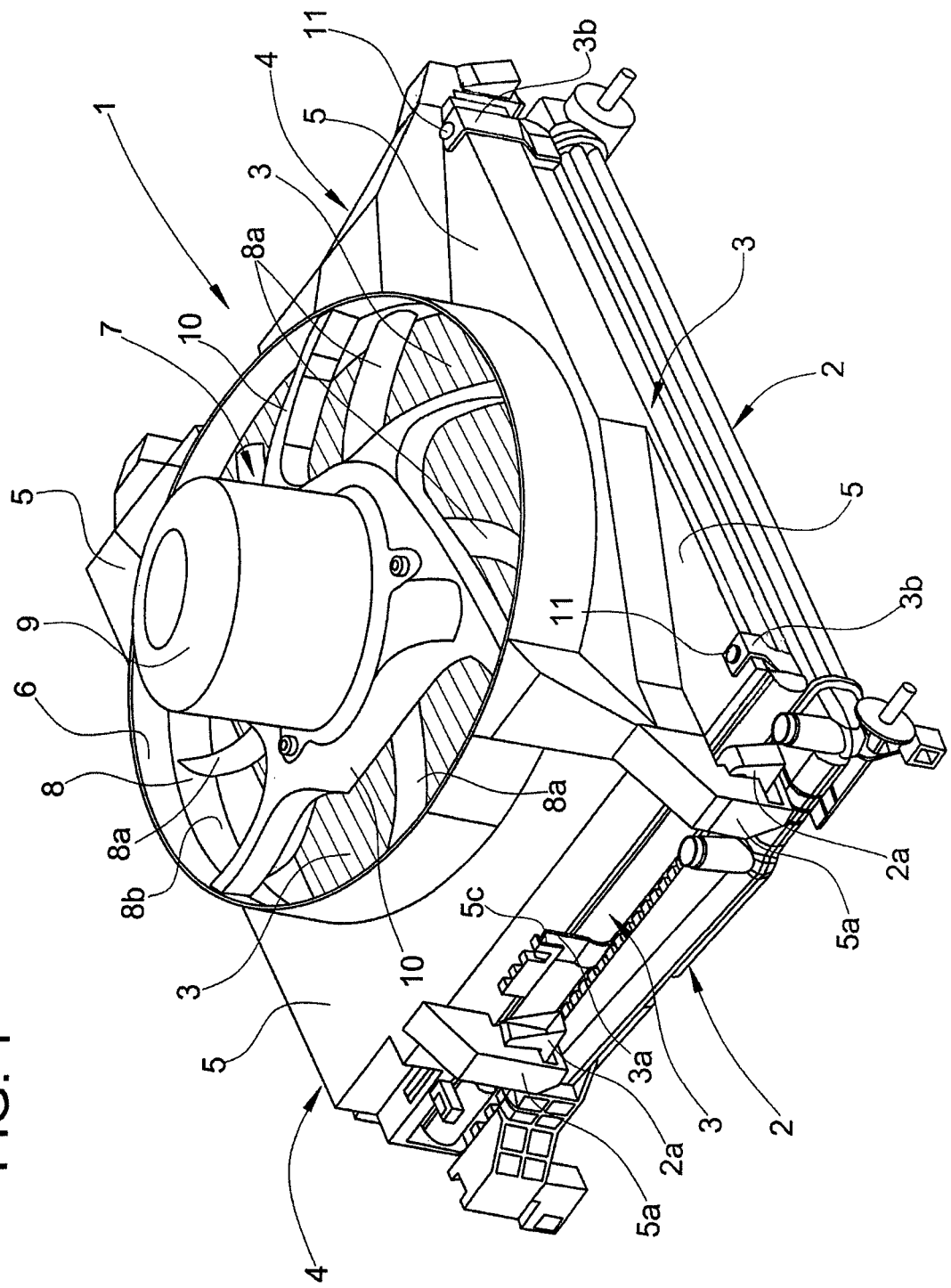
FIG. 1 is a perspective view of a cooling assembly according to the present invention, shown in an assembled state.

Reference numeral 1 in FIG. 1 overall denotes a cooling assembly according to the present invention for a motor vehicle provided with a liquid-cooled internal combustion engine as well as an air-conditioning system or installation.

Figure 2:
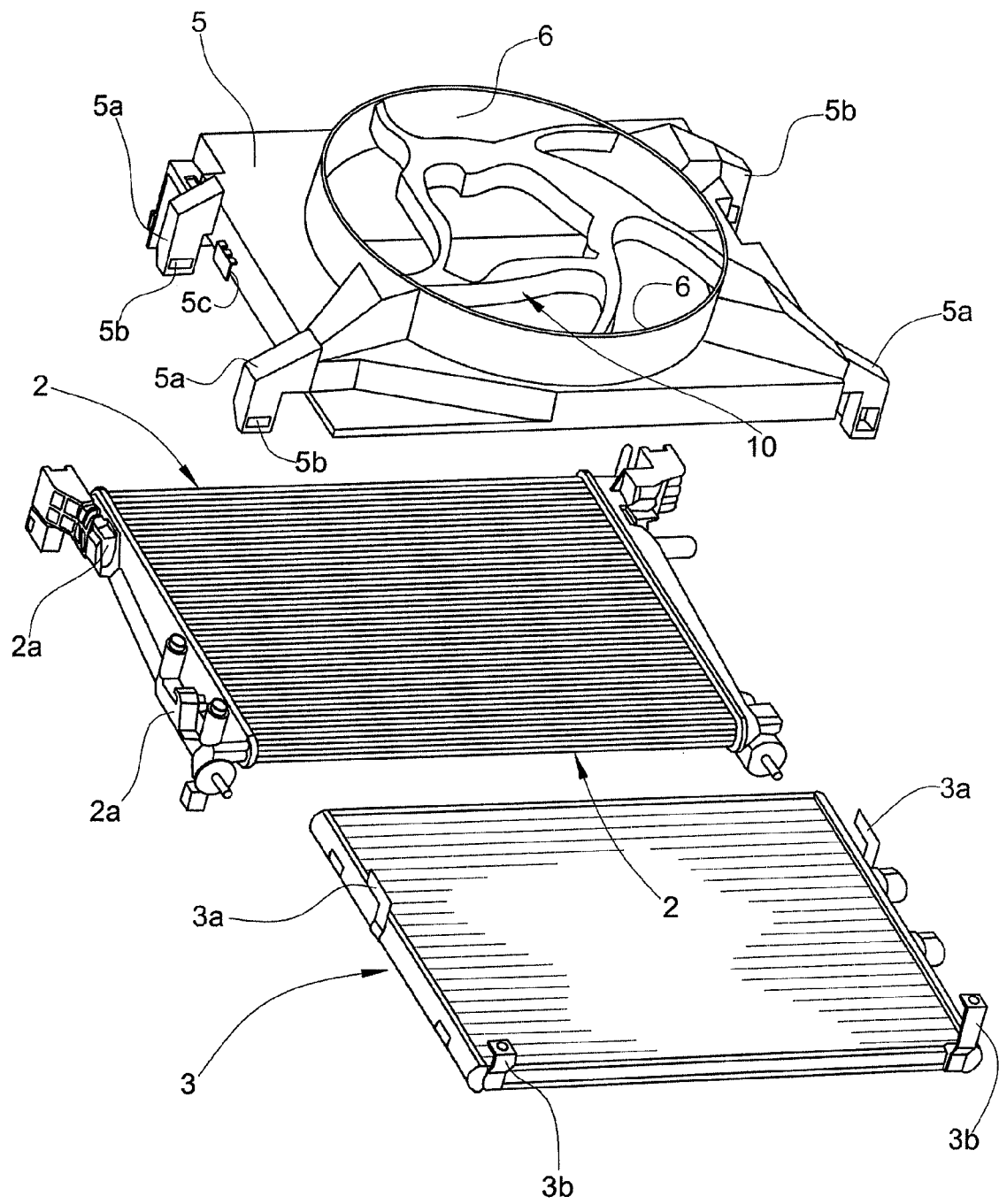
FIG. 2 is a partial perspective view showing, in exploded form, some components of the cooling assembly shown in FIG. 1.

The cooling assembly 1 comprises a radiator 2 of the type whose function is known per se, which can be seen more clearly in FIG. 2. This radiator 2 is intended to be supplied with a flow of liquid coolant coming from the engine (not illustrated) of the motor vehicle.

The cooling assembly 1 also comprises a condenser 3 for use in the air-conditioning system of the motor vehicle. This condenser 3 is likewise of a type whose function is known per se and is mounted facing the radiator 2.

Reference numeral 4 in FIG. 1 overall denotes a ventilation assembly, including a plate-like structure 5, also known as a "cowling" or "shroud". This shroud 5 is mounted facing the condenser 3, on the side of the condenser remote from the radiator 2.

In a manner known per se, the central part of the shroud 5 is provided with a duct 6, in which an electric fan 7 is mounted. This electric fan 7 comprises, in a manner known per se, an impeller or fan 8, which is mounted such that it can revolve in the duct 6 and is turned, during operation, by an electric motor 9 fastened to a supporting structure 10, which is expediently realized in one piece with the shroud 5. In a manner known per se, the fan or impeller 8 may comprise a plurality of curved blades 8a, the peripheral ends of which may be joined by a ring 8b.

Figure 3:
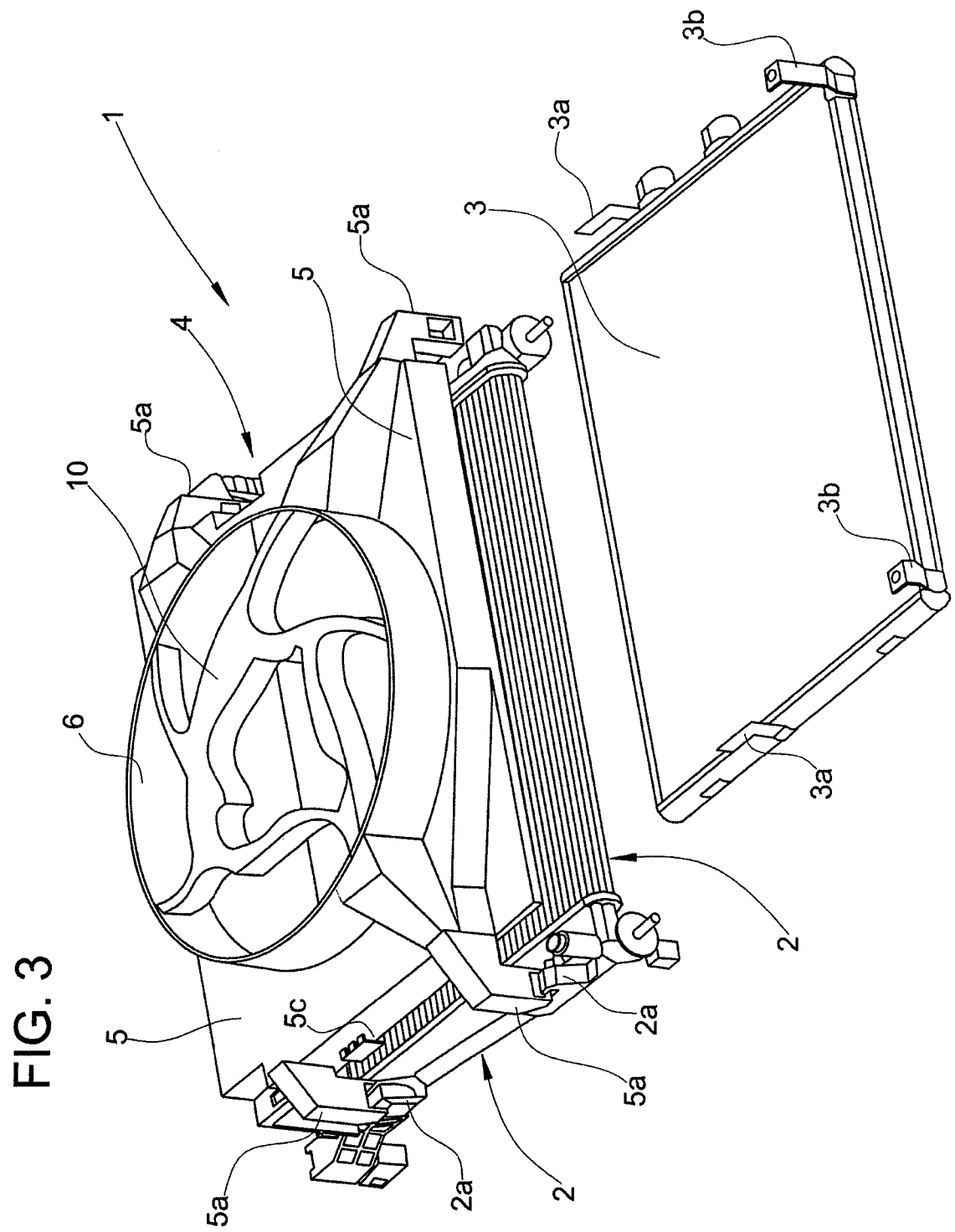

The ventilation assembly 4, which is expediently preassembled, is connected directly to the radiator, as can be seen in FIG. 3.

Figure 4:
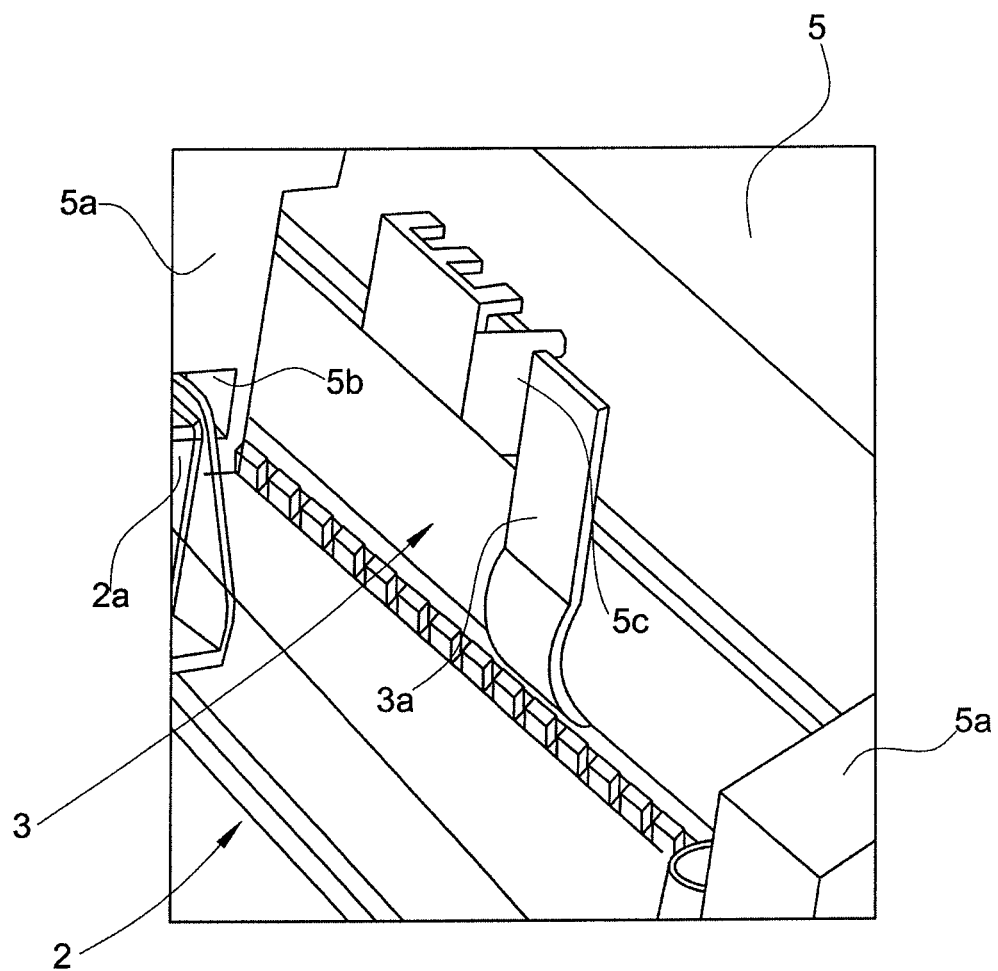
FIG. 4 is a view on an enlarged scale of a detail shown in FIG. 1.

In the exemplary embodiment illustrated, the shroud 5 of the ventilation assembly 4 has a plurality of appendixes 5a, which extend towards the radiator 2 and have respective openings or seats 5b (see in particular FIGS. 2 and 4), into which corresponding latching members 2a protruding from the radiator 2 can engage (see in particular FIG. 1).

In the embodiment illustrated by way of example, the latching elements 2a of the radiator 2 are shaped essentially like an inverted L, and they engage with the bent distal end thereof, preferably by way of a snap fastening, in the seats 5b of the appendixes 5a of the shroud 5 of the ventilation assembly 4.

The arrangement is such that, as can be seen in FIG. 3, an interspace is defined between the ventilation assembly 4 and the radiator 2 after the latter have been coupled, into which interspace the condenser 3 can be inserted, with a substantially translational displacement.

The condenser 3, in the embodiment illustrated, is provided with a plurality of appendixes 3a which protrude upward and are shaped essentially like an inverted L. These appendixes can be introduced, by way of the distal ends thereof, into corresponding seats 5c prearranged on the sides of the shroud 5 of the ventilation assembly 4 (see in particular FIG. 4).

In addition, the condenser 3 is expediently provided with one or more fastening brackets, such as those denoted by 3b in FIGS. 1 to 3, which protrude upward and the distal ends of which are bent and are fastened to the shroud 5 of the ventilation assembly 4 by respective screws 11 or the like (FIG. 1).

The cooling assembly 1 described above may be mounted in the engine compartment of a motor vehicle.

In order to carry out possible subsequent maintenance or repairs on the condenser 3, the latter can easily be detached and removed, separately from the radiator 2 and from the ventilation assembly 4, and can then be mounted again, leaving the radiator 2 and the ventilation assembly 4 in place. To that end, in order to remove the condenser 3, it suffices to undo the screws 11, and then extract the condenser with a translational displacement, which disengages the appendixes 3a thereof from the corresponding seats 5c of the shroud 5 of the ventilation assembly 4.

Although, in the exemplary embodiment illustrated, the condenser is coupled and fastened to the ventilation assembly 4, it is evident that, with simple modifications, the condenser could additionally or alternatively be coupled and possibly fastened to the radiator 2.

Clearly, without departing from the principle of the invention, embodiments and details of construction may vary considerably from those described and illustrated purely by way of non-restrictive example, without thereby departing from the scope of the invention as defined in the accompanying claims.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A cooling assembly for a motor vehicle provided with a liquid-cooled internal combustion engine, comprising:
   a radiator intended to be supplied with a flow of a liquid coolant coming from the engine,
   a condenser for use in an air-conditioning system of the vehicle, mounted facing the radiator in a first direction, and
   a ventilation assembly including a plate-like shroud mounted facing the condenser in said first direction, on a side remote from the radiator, and carrying a motor-driven fan capable of inducing a flow of air through the radiator and the condenser, said first direction being perpendicular to a surface of the plate-like shroud facing the radiator;
   wherein the ventilation assembly is fixed to the radiator by a locking structure, and the condenser is connected to the ventilation assembly and/or the radiator such that the condenser is separately detachable and extractable, and mountable again, leaving the ventilation assembly and the radiator being fixed together and immovable relative to each other in said first direction without unlocking the locking structure;
   wherein the ventilation assembly has a plurality of seats into which corresponding appendixes of the condenser are insertable during a translation displacement of the condenser in an interspace defined between the radiator and the ventilation assembly;
   wherein the condenser is unmovable relative to the radiator and ventilation assembly in said first direction when the condenser has been inserted into the ventilation assembly after the translational displacement in a second direction perpendicular to said first direction and parallel to said surface of the plate-like shroud.

2. The cooling assembly of claim 1, wherein the condenser is mountable and detachable between the radiator and the ventilation assembly with a translational displacement.

3. The cooling assembly of claim 1, wherein the appendix is substantially 'L' shaped, with a distal end of the appendix located in a corresponding seat of the ventilation assembly.

4. The cooling assembly of claim 1, wherein the condenser has at least one fastening bracket which protrudes transversely and is adapted to be detachably fastened to the ventilation assembly and/or the radiator.

5. The cooling assembly of claim 4, wherein the fastening bracket is fastened to the ventilation assembly and/or the radiator by a screw passing through a hole formed in the distal end of the fastening bracket.

6. The cooling assembly of claim 4, wherein the distal end of the fastening bracket is bent.

7. The cooling assembly of claim 1, wherein the shroud comprises a plurality of appendixes having respective openings in which corresponding latching members of the radiator are engaged.

8. The cooling assembly of claim 7, wherein the latching members are L shaped, with a distal end of the latching member snap fastened to the appendixes of the ventilation assembly.

9. A cooling assembly for a motor vehicle provided with a liquid-cooled internal combustion engine, comprising:
   a radiator intended to be supplied with a flow of a liquid coolant coming from the engine, a condenser for use in an air-conditioning system of the vehicle, mounted facing the radiator in a first direction, and a ventilation assembly including a plate-like shroud mounted facing the condenser in said first direction and carrying a motor-driven fan capable of inducing a flow of air through the radiator and the condenser, said first direction being perpendicular to a surface of the plate-like shroud facing the radiator;

wherein the plate-like shroud is mounted to the radiator in said first direction by a set of first engagement structures, and the condenser is detachably mounted to one of the plate-like shroud and the radiator at least by a set of second engagement structures separately formed with and spaced from the first engagement structures, the condenser being able to be removed and remounted without disengaging the set of first engagement structures;

wherein each second engagement structure includes a seat and an appendix which is inserted into the seat during a translational displacement of the condenser;

wherein the condenser is unmovable relative to the radiator and the ventilation assembly in said first direction when the condenser has been inserted into the ventilation assembly after the translational displacement in a second direction perpendicular to said first direction and parallel to said surface of the plate-like shroud.

10. The cooling assembly of claim 9, wherein the condenser is insertable and extractable with a translational displacement.

11. The cooling assembly of claim 10, wherein each first engagement structure includes a seat and a latching member locked into the seat.

12. The cooling assembly of claim 11, wherein the plate-like shroud is rectangular and the set of first engagement structures includes four engagement structures arranged at four corners of the rectangular plate-like shroud.

13. The cooling assembly of claim 11, wherein the condenser is detachably mounted between the radiator and the plate-like shroud.

14. The cooling assembly of claim 9, wherein the appendix is L shaped and has a first portion engaged into the seat and a second portion which is stopped outside the seat to limit the translational displacement of the condenser.

15. The cooling assembly of claim 9, wherein the condenser is detachably mounted to one of the plate-like shroud and the radiator by a set of third engagement structures, each third engagement structure comprising a fastening bracket via which the condenser is fastened to one of the shroud and the radiator by a fastener.

16. The cooling assembly of claim 15, wherein the fastener passes through a hole formed in a bent portion of the fastening bracket, the bent portion being parallel to the direction of the translational displacement of the condenser.

17. The cooling assembly of claim 15, wherein the fastening bracket extends from the condenser and the plate-like shroud is between the bent portion of the fastening bracket and the condenser.

* * * * *